United States Patent
Zhang (10) Patent No.: US 10,825,142 B2
(45) Date of Patent: Nov. 3, 2020

(54) HUMAN FACE RESOLUTION RE-ESTABLISHING METHOD AND RE-ESTABLISHING SYSTEM, AND READABLE MEDIUM

(71) Applicant: BOE TECHNOLOGY GROUP CO., LTD., Beijing (CN)

(72) Inventor: Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 201 days.

(21) Appl. No.: 16/062,339

(22) PCT Filed: Nov. 29, 2017

(86) PCT No.: PCT/CN2017/113642
§ 371 (c)(1),
(2) Date: Jun. 14, 2018

(87) PCT Pub. No.: WO2018/099405
PCT Pub. Date: Jun. 7, 2018

(65) Prior Publication Data
US 2018/0374197 A1    Dec. 27, 2018

(30) Foreign Application Priority Data

Nov. 30, 2016    (CN) .......................... 2016 1 1084243

(51) Int. Cl.
*G06T 3/40* (2006.01)
*G06T 5/50* (2006.01)

(52) U.S. Cl.
CPC .......... *G06T 3/4076* (2013.01); *G06T 3/4053* (2013.01); *G06T 5/50* (2013.01);
(Continued)

(58) Field of Classification Search
CPC . G06T 2207/20221; G06T 2207/30201; G06T 3/4053; G06T 3/4076; G06T 5/50
See application file for complete search history.

(56) References Cited

U.S. PATENT DOCUMENTS

2004/0246510 A1* 12/2004 Jacobsen ................ G06T 11/60
358/1.9
2005/0231512 A1* 10/2005 Niles ....................... G06T 13/20
345/473

(Continued)

OTHER PUBLICATIONS

Chen et al. Single Image Super-Resolution Based on Deep Learning and Gradient Transformation 2016 IEEE.*

(Continued)

*Primary Examiner* — Jingge Wu
(74) *Attorney, Agent, or Firm* — Collard & Roe, P.C.

(57) ABSTRACT

Proposed is a human face resolution re-establishing method based on machine learning, which retains overall structure information about a human face in the process of realizing image resolution improvement, and avoids the occurrence of a local distortion in a generated output image. The human face resolution re-establishing method includes: acquiring an input image, the input image having a first resolution; based on the input image and a standard gradient image library having a second resolution, determining image gradient information about the input image; fusing the image gradient information, and superposing the gradient information obtained through fusion onto the input image; and generating an output image, the output image having a third resolution, wherein the second resolution and the third resolution are both greater than the first resolution.

18 Claims, 6 Drawing Sheets

(52) U.S. Cl.
CPC .............. *G06T 2207/20221* (2013.01); *G06T 2207/30201* (2013.01)

(56) References Cited

U.S. PATENT DOCUMENTS

| | | | | |
|---|---|---|---|---|
| 2006/0214935 A1* | 9/2006 | Boyd | .................... | G06F 9/4488 345/473 |
| 2012/0299906 A1* | 11/2012 | Shiell | ...................... | G06T 15/04 345/419 |
| 2015/0154739 A1* | 6/2015 | Choudhury | ............... | G06T 5/00 382/266 |
| 2015/0363634 A1* | 12/2015 | Yin | .................... | G06K 9/00221 382/118 |
| 2017/0364771 A1* | 12/2017 | Pinheiro | ................ | G06N 20/00 |

OTHER PUBLICATIONS

Yang et al., "Structured Face Hallucination", IEEE Conference on Computer Vision and Pattern Recognition, IEEE Computer Society, 2013, pp. 1099-1106 (8 pages).

Tappen et al., "A Bayesian Approach to Alignment-Based Image Hallucination", ECCV, Part VII, LNCS 7578, Springer-Verlag Berlin Heidelberg, 2012, pp. 236-249 (14 pages).

English translation of Extended European Search Report in EP 17876582.2 mailed Jul. 6, 2020.

\* cited by examiner

HUMAN FACE RESOLUTION RE-ESTABLISHING METHOD AND RE-ESTABLISHING SYSTEM, AND READABLE MEDIUM

CROSS REFERENCE TO RELATED APPLICATIONS

This application is the National Stage of PCT/CN2017/113642 filed on Nov. 29, 2017, which claims priority under 35 U.S.C. § 119 of Chinese Application No. 201611084243.3 filed on Nov. 30, 2016, the disclosure of which is incorporated by reference.

The present application claims the priority of a Chinese patent application No. 201611084243.3 filed on Nov. 30, 2016. Herein, the content disclosed by the Chinese patent application is incorporated in full by reference as a part of the present application.

TECHNICAL FIELD

The present disclosure relates to image processing, in particular to a human face resolution re-establishing method based on machine learning, a re-establishing system, and a readable medium.

BACKGROUND

Human face super-resolution re-establishing technology can mainly be applied to amplify pictures stored in existing IC cards, so as to make it convenient to review and print, etc. In circumstances of high cost on changing existing (storing and collecting) devices and low feasibility of re-collecting and so on, the super-resolution re-establishing technology is very applicable.

Additionally, super-resolution processing can be performed on human face images obtained from security systems and monitoring devices, for the purpose of being recognized. Due to limitations of hardware process and cost, clear high-resolution images may not be collected in the monitoring and controlling field. The use of the super-resolution re-establishing technology can reduce reliability on hardware devices and enhance availability of the system.

SUMMARY

There is provided in an embodiment of the present disclosure a human face resolution re-establishing method, comprising: obtaining an input image having a first resolution; determining image gradient information of the input image based on the input image and a standard gradient image library having a second resolution; merging the image gradient information, and superimposing merged image gradient information into the input image; generating an output image having a third resolution, wherein both the second resolution and the third resolution are greater than the first resolution.

According to the embodiment of the present disclosure, the image gradient information comprises an edge gradient and a second resolution characteristic gradient.

According to the embodiment of the present disclosure, the edge gradient is a human face contour gradient, and determining an edge gradient of the input image comprises: up-sampling the input image, and reserving its directional characteristic, to obtain a first image; calculating gradient information of the first image as the edge gradient information of the input image.

According to the embodiment of the present disclosure, the second resolution characteristic gradient is a facial characteristic gradient corresponding to the input image in a standard gradient image library, and determining the second resolution characteristic gradient comprises: estimating a pose and position of the input image, and extracting a characteristic point of the input image; looking up a corresponding facial characteristic component in the standard gradient image library based on the pose and position, and the characteristic point; calculating a characteristic gradient of the corresponding facial characteristic component, and determining it as the second resolution characteristic gradient.

According to the embodiment of the present disclosure, the looking up the corresponding facial characteristic component comprises: aligning the pose and position of the input image with a pose and position of an image sample in the standard gradient image library according to the pose and position of the input image; finding out a facial characteristic component corresponding thereto in the standard gradient image library according to characteristic points of the input image.

According to the embodiment of the present disclosure, the pose and position of the input image is aligned with the pose and position of the image sample in the standard gradient image library according to the following formula:

$$\min \Sigma \|T(x(h),y(h)) - (x(l),y(l))\|^2$$

where $T(x(h), y(h))$ is a non-reflective symmetry transform of the image sample, and $(x(l),y(l))$ is an up-sampled input image, and when a characteristic point coordinate position difference value between a result of the non-reflective symmetry transform and the up-sampled input image reaches the minimum, image alignment is determined.

According to the embodiment of the present disclosure, the image gradient information further comprises a background gradient.

According to the embodiment of the present disclosure, the background gradient is a gradient of a flat region in the input image, and determining the background gradient comprises: up-sampling the input image to obtain a second image; calculating gradient information of the second image as the background gradient information of the input image.

According to the embodiment of the present disclosure, the process of obtaining the second image comprises: selecting a background region of the low-resolution image according to a self-learning statistic prior mode; transforming the background region into a high-resolution image with a set scale transformation factor s, wherein each pixel of the background region is up-sampled as s*s pixel blocks; ensuring that an image obtained by up-sampling satisfies Gaussian distribution through a back propagation algorithm.

According to the embodiment of the present disclosure, merging the image gradient information comprises: setting that an upper-left pixel value of the image region after the information is merged equates to an upper-left pixel value of the input image, and then obtaining merging information by utilizing the least square principle:

$$\min \sqrt{(\nabla s - b)^2}$$

where $\nabla$ is a gradient operator, b is gradient, and s is the merging information to be acquired.

According to the embodiment of the present disclosure, the re-establishing method further comprises constructing the standard gradient image library.

According to the embodiment of the present disclosure, the human face resolution re-establishing method further comprises aligned image samples in the standard gradient image library.

According to the embodiment of the present disclosure, aligning image samples in the standard gradient image library comprises:

selecting one image sample from the standard gradient image library as a standard image;

obtaining characteristic points of the standard image according to a SIFT algorithm, and selecting one characteristic point set therefrom and storing it;

aligning other image samples in the standard gradient image library with the standard image comprises: selecting an image sample from the standard gradient image library as an aligned image, obtaining characteristic points of the aligned image according to the SIFT algorithm, and finding out a characteristic point set most similar to the characteristic point set of the standard image;

rotating and scaling the aligned image until its characteristic point set has a proportional correspondence relationship of the characteristic point set in the standard image;

translating a coordinate of the characteristic point set of the aligned image to a position of the characteristic point set of the standard image to obtain a SIFT light stream;

utilizing light stream information to translate other pixel points in the aligned image to a corresponding position on the standard image, and completing alignment of the aligned image and the standard image.

According to the embodiment of the present disclosure, the human face resolution re-establishing method further comprises training the standard gradient image library.

According to the embodiment of the present disclosure, a step of training the standard gradient image library comprises:

training each image sample in the standard gradient image library, wherein a process of training each image sample comprises: selecting one image sample from the standard gradient image library as a training sample, Gaussian smoothing and down-sampling the training sample to obtain a third image, and obtaining a characteristic mask pattern from the third image, wherein the characteristic mask pattern covers a characteristic component defined by characteristic points of the third image;

utilizing the characteristic mask pattern to look up a most similar facial characteristic component from the standard gradient image library by means of self-learning;

extracting a characteristic gradient from the most similar facial characteristic component looked up; and completing training of the training sample.

According to the embodiment of the present disclosure, performing up-sampling through a bicubic interpolation method to acquire the edge gradient:

$$f(x, y) = \sum_{i=0}^{3} \sum_{j=0}^{3} (x(i), y(j))W(x - x(i))W(y - y(j))$$

(x,y) is a pixel point to be interpolated, (x(i), y(j)) is 4×4 neighborhood point nearby the pixel point to be interpolated, i,j=0, 1, 2, 3, and W is a weighting function.

There is further provided in an embodiment of the present disclosure a human face resolution re-establishing system, comprising: one or more processors; one or more memories, wherein the memory stores a computer executable instruction, and executes the human face resolution re-establishing method when the computer executable instruction is ran by the processor.

According to the embodiment of the present disclosure, the human face resolution re-establishing system further comprises an input terminal which receives an input image having a first resolution and an output terminal which outputs an output image having a third resolution, wherein the third resolution is higher than the first resolution.

There is provided in an embodiment of the present disclosure a computer readable medium which stores a computer executable instruction, and executes the human face resolution re-establishing method when it the executable instruction is ran by a processor.

There is proposed in the present disclosure the human face resolution re-establishing method based on machine learning. This method calculates the image gradient information from the input image having a relatively low resolution, looks up the corresponding facial characteristic component from the standard gradient image library having a relatively high resolution, merges the obtained gradient information, and superimposes it to the input image to obtain an output image whose resolution has been increased. On such a basis, the entire structure information of the human face is reserved in the process of realizing increase of the image resolution, so that local distortion is avoided from occurring in the generated output image.

BRIEF DESCRIPTION OF THE DRAWINGS

In order to describe the technical solution of embodiments of the present disclosure more clearly, accompanying figures of the embodiments will be introduced simply. Obviously, the figures described below only relate to some embodiments of the present disclosure, instead of limiting the present disclosure.

DETAILED DESCRIPTION

Technical solutions in embodiments of the present disclosure will be described below clearly and completely by combining with the accompanying figures of the embodiments of the present disclosure. Obviously, the embodiments described below are just a part of embodiments of the present disclosure, but not all the embodiments. Based on the embodiments in the present disclosure, all the other embodiments obtained by those ordinary skilled in the art without paying any inventive labor belong to the scope sought for protection in the present disclosure.

Unless otherwise defined, technical terms or scientific terms used herein shall have common meanings understood by those ordinary skilled in the art. "First", "second" and other similar words used in the present disclosure do not represent any sequence, quantity or importance, but are just used to distinguish different components from each other.

Human face resolution re-establishing is a process of generating a high-resolution image according to a low-resolution human face image by means of fidelity-preserving. You could say that it is a super-resolution technique in a specific field.

Most of the existing technique is based on block similarity or global constraint of the entire image. High-resolution and low-resolution image blocks construct models based on the probability framework, extract high-frequency details from a standard image, and in order to cut respective query blocks from the input image, recovers the most similar image block from the standard sample set, and obtain the corresponding high-resolution image block by calculating a first order derivative and a second order derivative. This method would preserve more details. However, since the high-resolution image block is not structured, it results in occurrence of some image artifacts.

In addition, there is a technique where sub-space learning is performed on a training sample set through Principle Component Analysis (PCA), and the high-resolution image is obtained by using linear constraints. Redundant information is reconstructed based on Markov Random Field model of image blocks, and high-frequency details are recovered. Due to limitation of linear sub-space, a better resolution re-establishing effect can be obtained only when an image behaves well (fixed posture and expression, and accurate alignment). When the images do not satisfy the above conditions, the use of the overall appearance model of PCA results in that ghosts always occur to the images.

The above re-establishing method does not consider the entire structure information of the human face in the input low-resolution image, such that effects of artifacts, ghosts or local distortion would occur to the input high-resolution image.

There is proposed in the present disclosure a human face resolution re-establishing method based on machine learning. This method reserves the entire structure information of the human face in the re-establishing process, combines with human face characteristic gradient information and background gradient information, and generates a high-resolution human face image according to a standard gradient image library, so that picture quality and self-adaptive effect of the reconstructed image are improved.

There is proposed in the embodiment of the present disclosure a human face resolution re-establishing method. This method may be an intelligent algorithms executed by a neural network (for example, convolutional neural network) based on deep learning. The convolutional neural network can be realized by adopting neural network models such as AlexNet, GoogleNet, VGG, Deep Residual Learning, etc.

Figure 1:
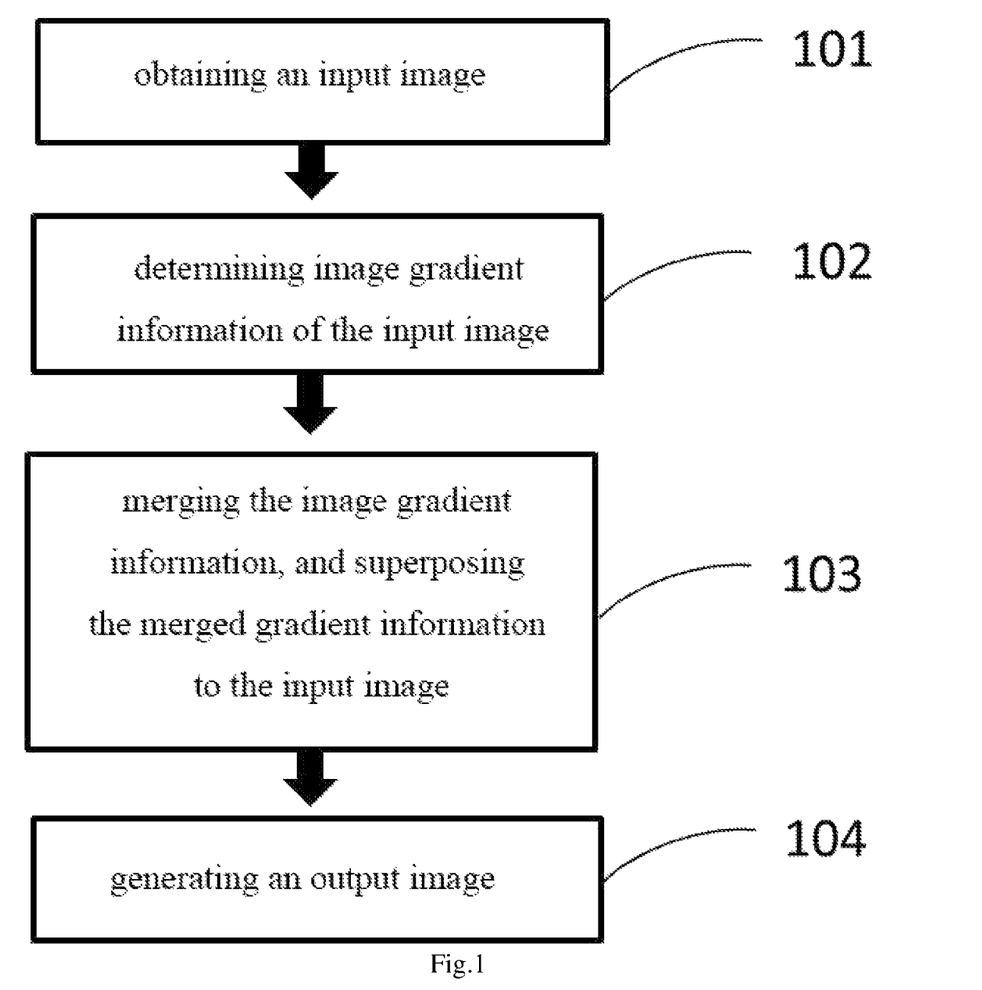
FIG. 1 shows a flow block diagram of a human face resolution re-establishing method.

The flow block diagram of the human face resolution re-establishing method according to the embodiment of the present disclosure is as shown in FIG. 1. In step S101, an input image is obtained, and the input image has a first resolution. The input image is a human face image whose resolution is going to be raised, and has generally a relatively low resolution. The specific structure of the human face is very fuzzy, and high frequency information in the human face needs to be supplemented, so as to obtain a clear human face image. The human face image fully contains information on the low-resolution image, i.e., keeping in consistency with the structure of the original image, and also contains information on supplementary details. This method of enhancing the human face image resolution is also called as "human face illusion". In step S102, image gradient information of the input image is determined based on the input image and the standard gradient image library having a second resolution. The standard gradient image library comprises an image sample. The image sample has the second resolution, and the second resolution is a concept relative to the first resolution but does not specifically refers to a numeric value. The second resolution is always higher than the first resolution, so that the human face comprises more information on details, so as to generate information on details of human face characteristics in the input image according to facial characteristic components corresponding to the input image in the image library, i.e., guessing human face details in the input image according to the standard gradient image library. For example, the facial characteristic component can generally refer to facial characteristics of human face such as eye, ear, mouth, nose, etc. These characteristics are also reference characteristics used to complete human face alignment.

In particular, the re-establishing method further comprises establishing the standard gradient image library.

Next, in step S103, the image gradient information determined in step S102 is merged, and the merged gradient information is superposed to the input image.

In step S104, an output image is generated, and the output image has a third resolution. The third resolution is a concept relative to the first resolution, is higher than the first resolution, but does not specifically refer to a numeric value. That is, in the above human face resolution re-establishing process, a super-resolution output image is obtained by combining with the image samples in the standard gradient image library having relatively high resolution according to the input image having a relatively low resolution. This output image can clearly reflect facial characteristics of human face, and can be used in fields such as human face monitoring, human face identifying, human face image expression analysis, etc.

In the embodiment of the present disclosure, the second resolution is higher than the first resolution, the third resolution is higher than the first resolution, and the first, the second and the third do not represent any sequence, quantity or importance. For example, the first resolution can be generally a low resolution, and the second resolution can be generally a high resolution. The third resolution is generally a super resolution, i.e., realizing super-resolution human face re-establishing by implementing the human face resolution re-establishing method on the low-resolution input image.

Figure 2:
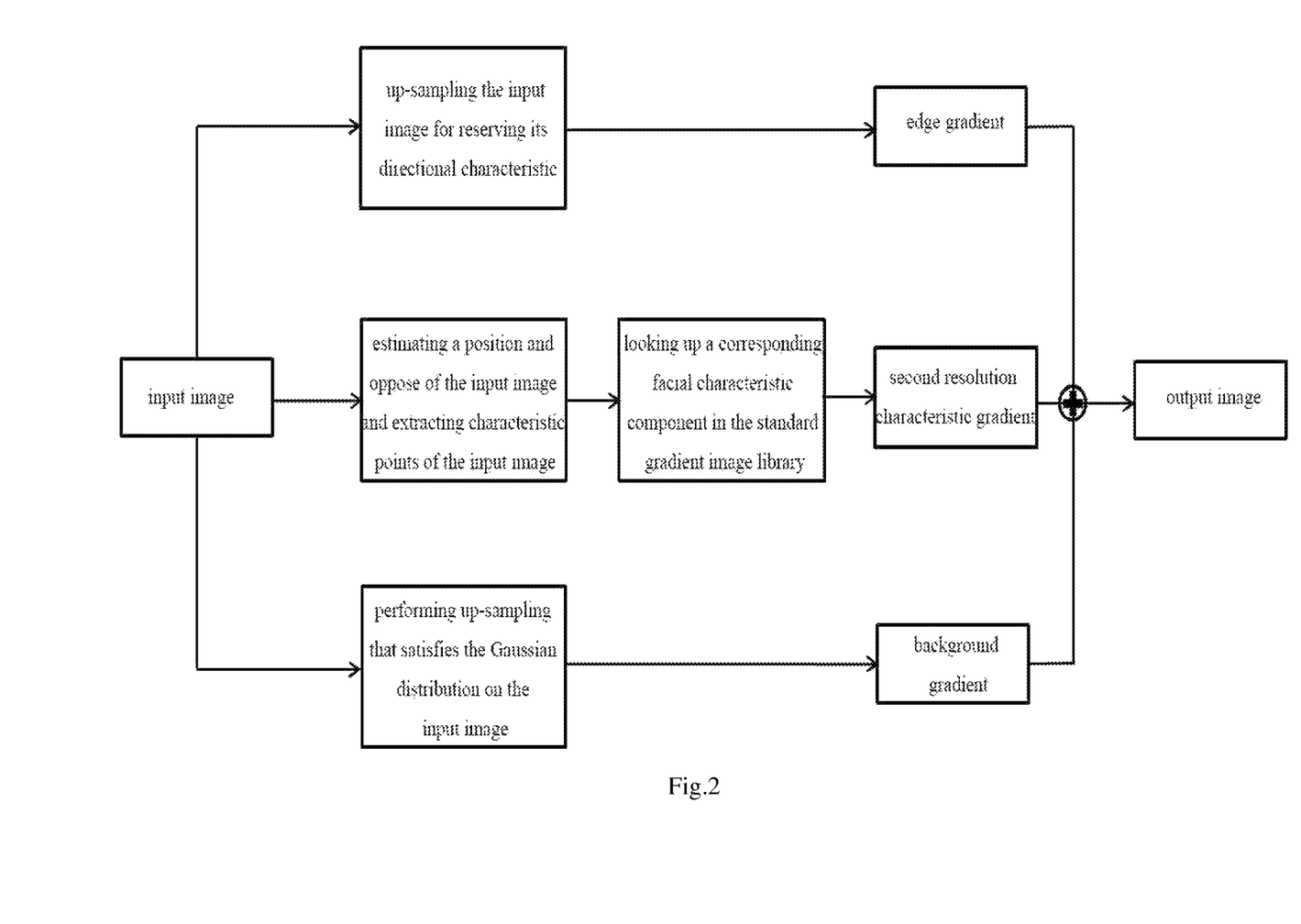
FIG. 2 shows a schematic diagram of generating an output image according to image gradient information of an input image.

According to the embodiment of the present disclosure, the image gradient information in step S102 comprises an edge gradient and a second resolution characteristic gradient. FIG. 2 shows a schematic diagram of generating a high-resolution output image according to the image gradient information. The human face resolution re-establishing method will be described in detail by combining with FIG. 2.

The edge gradient is a contour gradient of the human face in the input image, and represents the entire structure information of the human face. By using the edge gradient, the entire contour of the original image would not loose in the process of generating the output image, so that phenomena of reducing the image re-establishing effect such as local distortion, artifacts, ghosts and so on in generated image is avoided from occurring. As shown in FIG. 2, the edge gradient is acquired by performing up-sampling for maintaining directional characteristic on the input low-resolution image. In the embodiment of the present disclosure, by means of statistics prior of learning, structure information of the edge is preserved and shape information thereof is stored, to remove fake artifacts. The up-sampling function for maintaining the direction is as follows:

$$fx(p)=\exp(-\|P-Qk\|\sigma), k=1, \ldots K;$$

where P is a pixel block centering on a pixel p, and Qk is a neighboring pixel block of the pixel p in the direction K. The reason for using the pixel block instead of the pixel is that compared with a single pixel, the pixel block has stronger capability in resisting noise interference. That is, the calculation result fk(p) represents a direction of the pixel block centering on the pixel p. Each pixel point which is interpolated in this pixel block preserves this direction. In terms of a numerical value, the up-sampling adopts bicubic interpolation:

$$f(x, y) = \sum_{i=0}^{3} \sum_{j=0}^{3} (x(i), y(j)) W(x - x(i)) W(y - y(j))$$

where (x, y) is a pixel point to be interpolated, (x(i), y(j)) is a 4×4 neighborhood point nearby the pixel point to be interpolated, i,j=1, 1, 2, 3, and W is a weighing function.

The image obtained by conducting the up-sampling for preserving the directional characteristic on the input image is called as a first image, which preserves the contour information of the human face in the input image and is used for generating the human face contour information in the high-resolution output image. The gradient information of the first image is calculated as the edge gradient of the input image.

In the embodiment of the present disclosure, division of image blocks is performed on the input image and the image samples of the standard gradient image library by means of backing. For example, the image blocks can be divided in a sequence from left to right and from up to down. When the image edge is being divided, if the remaining size is smaller than a predetermined size of the image block, then division is conducted starting from the image edge by means of backing. For example, when the right edge of the image is being divided, the image backs left by taking the right edge as a benchmark; when the down edge of the image is being divided, the image backs up by taking the down edge as a benchmark.

The second resolution characteristic gradient represents the gradient information based on the human face facial characteristic component. As shown in FIG. 2, the process of determining the second resolution characteristic gradient comprises:

(1) estimating a pose and position of an input image, and extracting characteristic points of the input image;

(2) looking up a corresponding facial characteristic component in the standard gradient image library based on the pose and position and the characteristic points;

(3) calculating a facial characteristic gradient of the corresponding facial characteristic component, and determining it as the second resolution characteristic gradient.

Herein, the step of looking up a corresponding facial characteristic component in the standard gradient image library based on the pose and position and the characteristic points of the input image comprises: aligning the pose and position of the input image with the pose and position of the image samples in the image library according to the pose and position of the input image, and then looking out the facial characteristic component corresponding thereto in the standard gradient image library according to the characteristic point of the input image. The facial characteristic component usually refers to the human face facial characteristics such as eye, ear, mouth, and nose, etc. These features are also reference characteristics used to complete human face alignment.

In the embodiment of the present disclosure, the pose and position alignment has been already conducted on the image samples in the standard gradient image library. The specific step of aligning will be described in detail in the following text. The alignment and the step of aligning are advantageous for looking up more accurately, which would avoid failure in looking up due to rotation or shift of the human face characteristic. At the same time, the alignment and the aligned image can be used for merging and superposing of the gradient information.

The step of aligning the input image with the image samples in the standard gradient image library according to the pose and position can be conducted according to the following formula:

$$\min \Sigma \|T(x(h), y(h)) - (x(l), y(l))\|^2$$

where is a non-reflective symmetric transform of the image sample, and (x(l), y(l)) is an up-sampled input image. When a characteristic point coordinate position difference value between the result of the non-reflective symmetric transform and the up-sampled input image reaches the minimum, it can be considered as image alignment.

Facial characteristic components corresponding to an aligned input image is looked up more accurately through an input image aligning with image samples in the standard gradient image library. Further, it is capable of recovering facial characteristics closer to original input images according to the facial characteristic components accurately looked up. The facial characteristic gradient of the looked up facial characteristic components is calculated and determined as the second resolution characteristic gradient.

In the embodiment of the present disclosure, the image gradient information can further comprise a background gradient, which represents a gradient of a flat region in the input image. Obtaining the background gradient comprises: up-sampling the input image in combination with the process of low pass filtering, and in the process of up-sampling, it shall be guaranteed that the sampled image satisfies the Gaussian distribution, to obtain the second image, and the gradient information of the second image is taken as the background gradient information of the input image. The background gradient can be used for the subsequent human face resolution re-establishing process together with the edge gradient and the second resolution characteristic gradient.

In particular, small pixel blocks can be used in the above process of obtaining the background gradient to calculate large amplitude changes of facial expressions. The background region of the input image is selected according to the self-learning statistic prior mode, to transform the background region into an image having a relatively high resolution by a set scale transform factor s and up-sample each pixel of the background region as s*s pixel blocks. Herein, through back propagation algorithm, it shall guarantee that the image obtained by up-sampling satisfies the Gaussian distribution, low pass filtering is performed on the background region of the obtained second image, and gradient is extracted therefrom as the background gradient. For processing of the background region, it does not require to loop up the standard gradient image library, but only needs to transform a specific portion cut from the input image per se from the low resolution into the high resolution, and then extracts the gradient.

Based on the above, in the embodiment of the present disclosure, the obtained image gradient information comprises the edge gradient, the second resolution characteristic gradient and the background gradient of the input image. The above three kinds of gradients represent the gradient information of different compositions in the input image: the edge gradient represents the contour information of the human face and is used to ensure that the entire structure of the reconstructed image maintain in consistency with the input image; the second resolution characteristic gradient represent the gradient of specific facial characteristic components in the human face and is used to generate detailed information of facial components or others in the process of reconstructing the human face resolution; the background gradient represents information on the flat region whose structural features are implicit in the input image, so that the background in the generated output image is in consistency with the input image, which further avoids phenomena such as artifacts, edge local distortion, etc.

According to the human face resolution re-establishing method provided in the embodiment of the present disclosure, the image gradient of the input image has been obtained based on step S102. Next, in step S103, the image gradient information is merged, and the merged gradient information is superposed into the input image. It shall be understood that in the embodiment of the present disclosure, the image gradient information comprises the edge gradient, the second resolution characteristic gradient and the background gradient, and at least two kinds of gradient information are merged. In other embodiments according to the present disclosure, one or several kinds of the image gradient information or other kinds of image gradient information may be included. Merging the image gradient information means to merge at least two kinds of gradient information in the image gradient information.

In the embodiment of the present disclosure, merging of the gradient information is performed by following means:

Firstly, it is set that a pixel value in the top left of the image region after information is merged is equal to a pixel value in the top left of the input image, and secondly, the merged information is acquired by using the least square principle:

$$\min \sqrt{(\nabla s - b)^2}$$

where $\nabla$ is a gradient operator, b is a gradient, and s is the merged information to be acquired.

In the embodiment of the present disclosure, the edge gradient, the second resolution characteristic gradient and the background gradient of the input image are merged to obtain the merged gradient information.

In the embodiment of the present disclosure, the superposing method in step S103 can be obtained by adopting the method of averaging the additions, or can be realized by adopting the following formula. It is assumed that the image is I, the gradient is g, the weighting parameter is b, and the numerical range of b is an open interval of (0, 1), the superposed image is;

$$m = b*I + (1-b)*g$$

where the value of b is always selected by experience appropriately.

Compared with the input image, the output image obtained through the above steps not only has consistent image information, but also has higher resolution. By adopting parameters such as the edge gradient, the second resolution characteristic gradient and the background gradient or the like in the process of generating, it makes that phenomena such as artifacts, ghosts, local distortion are avoided from occurring in the generated high-resolution output image, thereby furthering enhancing the effect of human face re-establishing.

According to the embodiment of the present disclosure, the standard gradient image library used in the human face resolution re-establishing method comprises a series of a human face image sample having a resolution higher than the resolution of the input image.

The human face re-establishing provided in the embodiment of the present disclosure further comprises aligning the image samples in the standard gradient image library. Before the facial characteristic components corresponding to the input image are determined according to the standard gradient image library, positions and poses of the image samples in the image library shall be aligned, so that it is convenient to accurately look up the facial characteristic components and also make it convenient for the process of training the standard gradient image library described in the following text.

Figure 3:
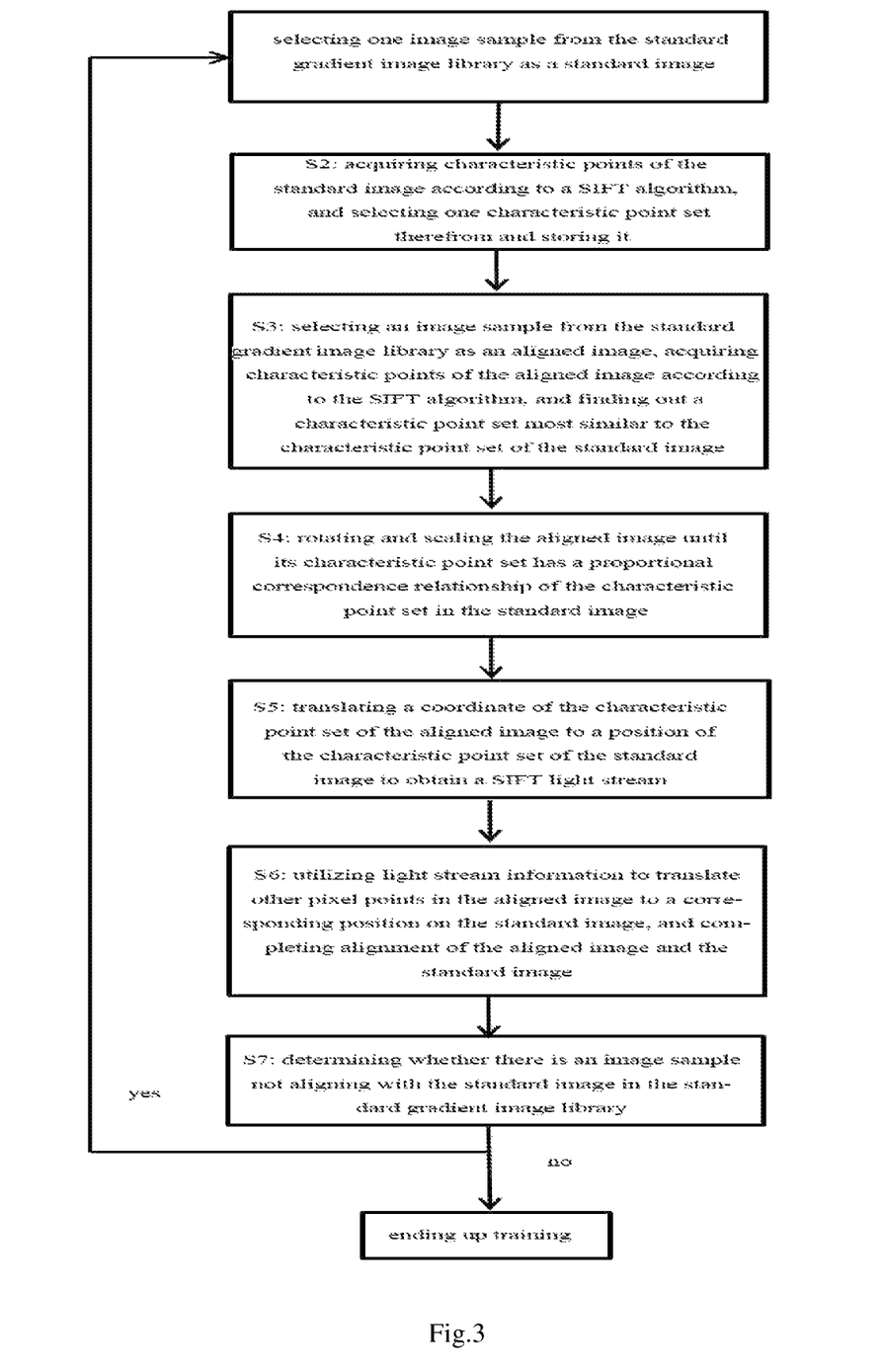
FIG. 3 shows a flow block diagram of aligning image samples in a standard gradient image library.
Figure 4:
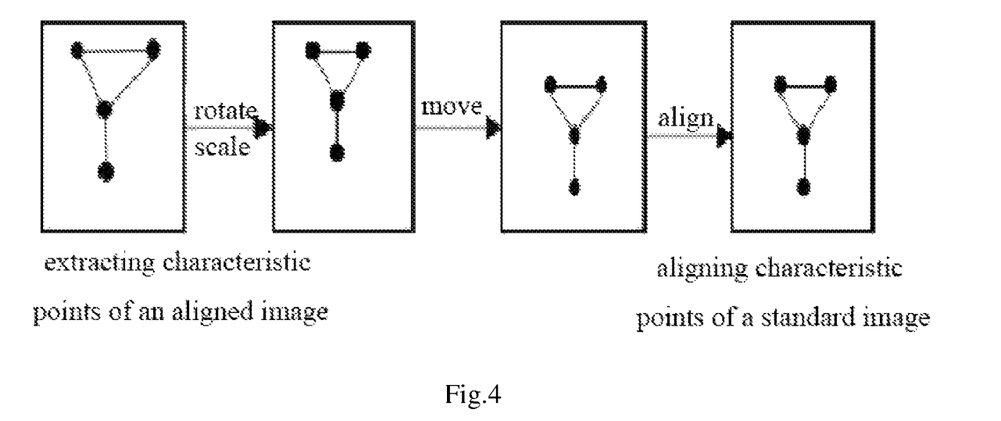
FIG. 4 shows a schematic diagram of aligning flows in FIG. 3.

FIG. 3 shows a particular flow diagram of aligning the image samples. FIG. 4 shows a schematic diagram of aligning the image samples. The process of aligning the image samples will be described in detail by combining with FIGS. 3 and 4.

Firstly, as shown in FIG. 3, in step S1, one image sample is selected from the standard gradient image library as the standard image. By taking the position and pose of the standard as the benchmark, the positions and poses of other image samples are aligned therewith. In step S2, characteristic points of the standard images are calculated according to the SIFT algorithm, and one characteristic point set is selected from the characteristic points and are stored. Then, in step S3, another image sample is selected from the standard gradient image library as an aligned image. Characteristic points of the aligned image are calculated according to the SIFT algorithm, and a characteristic point set most similar to the characteristic point set of the standard image are found out therefrom, and the characteristic point set is used for aligning the position and pose.

In step S4, the aligned image is rotated and scaled until its characteristic point set has a proportional correspondence relationship with the characteristic point set in the standard image. The specific schematic process is as shown in FIG. 4. In step S5, the characteristic points of the aligned image is translated to the position of the characteristic point set of the standard image, to obtain SIFT light stream. Then, in step S6, the light stream information is utilized to translate other pixel points in the aligned image to the corresponding position of the standard image, so as to complete the process of aligning the aligned image and the standard image. The aligned image has a position and pose consistent with the standard image, which is capable of making it advantageous for the looking-up step of the human face resolution re-establishing method.

In step S7, it is determined whether there is an image sample not aligning with the standard image in the standard gradient image library. If there is an image sample not aligning with the standard image, then the image sample is selected as an aligned image, the aligning flows in steps S3-S5 are executed. If there is no image sample not aligning with the standard image, then the aligning process is ended up. When the image samples in the standard gradient image library is updated, the above aligning process shall also be performed on an updated image sample, so as to ensure that the image samples in the standard gradient image library have consistent positions and poses.

Figure 5:
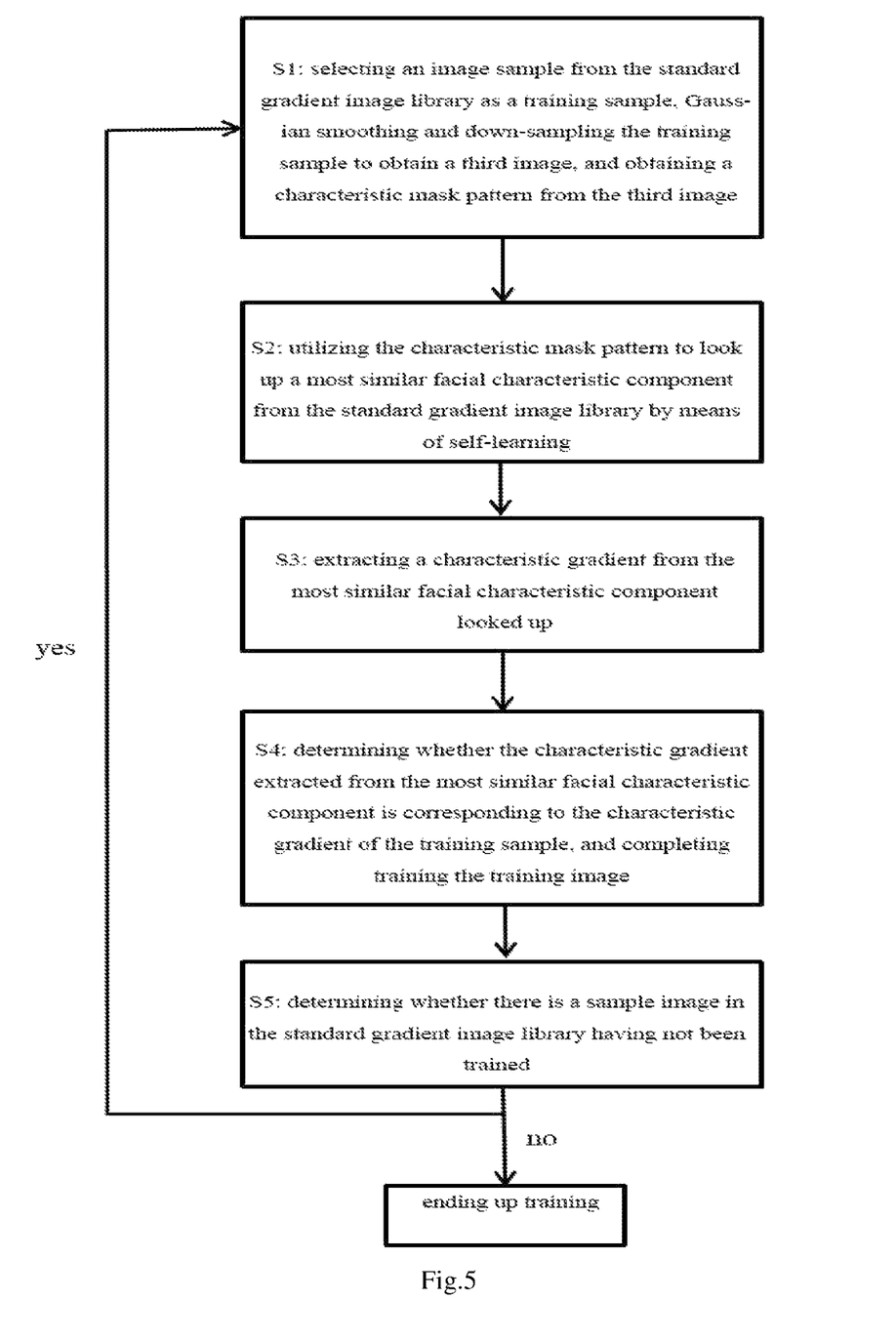
FIG. 5 shows a flow block diagram of training image samples in a standard gradient image library.

The face human re-establishing method provided in the embodiment of the present disclosure further comprises training the standard gradient image library. Each piece of image sample in the standard gradient image library shall be corresponding to one characteristic point set. The specific training flow is as shown in FIG. 5. First, in step S1, one image sample is selected from the standard gradient image library as a training sample, wherein the image sample is never selected as a training sample before. Gaussian smoothing process and down-sampling is performed on the training sample, so as to obtain a low resolution third image and obtain a characteristic mask pattern from the third image. The characteristic mask pattern covers characteristic components defined by characteristic points of the third image.

In step S2, by utilizing the characteristic mask pattern obtained in step S1, the most similar facial characteristic component is looked up in the standard gradient image library, for example, looking up by means of self-learning. Next, in step S3, a characteristic gradient is extracted from the most similar facial characteristic components found out. In step S4, it is determined whether the characteristic gradient extracted from the most similar facial characteristic component is corresponding to the characteristic gradient of the training sample, so as to complete the process of training the training sample. Through repeated training, it can urge to look up the human face facial characteristic component closer to the input image in the process of human face resolution re-establishing.

In step S5, it is determined whether there is any image sample in the standard gradient image library which has not been selected as a training sample. If there is an image sample having not been selected as a training sample, then it turns back to the step S1, i.e., selecting the image sample as the training sample, proceeding to the training steps S1-S4. If there is not an image sample having not been selected as a training sample, then the training is ended up. When the image samples in the standard gradient image library are updated, the above training process can also be performed on the updated image samples.

The above training process can enable the human face re-establishing method according to the embodiment of the present disclosure to adjust parameters so as to be adaptive to the current standard gradient image library, i.e., being capable of finding out the most similar facial characteristic component more efficiently. For example, in the process of looing up, the method according to the embodiment of the present disclosure adjusts iteratively the parameters according to a better result obtained. In the human face resolution re-establishing, the input low-resolution image is equivalent to the training sample herein.

Based on the above, the present disclosure proposes a human face resolution re-establishing method based on machine learning. In the re-establishing process, this method reserves the entire structure of human face through the human face edge gradient information in the re-establishing process, combines with the human face characteristic gradient information and the background gradient information, and generates a high-resolution human face image according to the standard gradient image library, thereby enhancing the image quality and self-adaptive effect of the reconstructed image.

Figure 6:
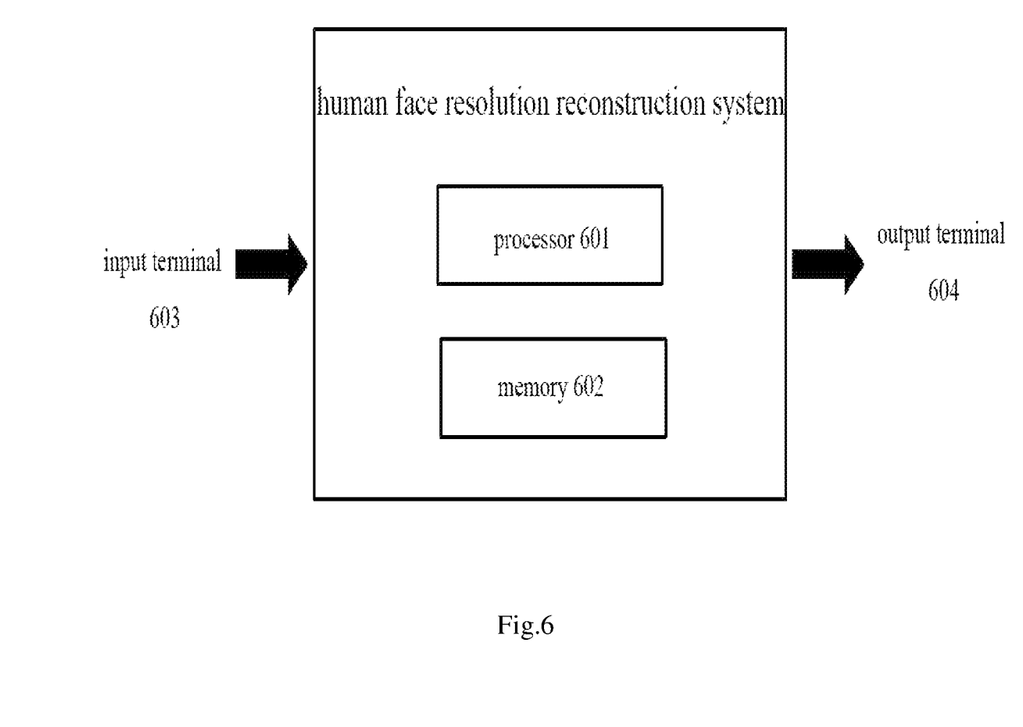
FIG. 6 shows a schematic diagram of a human face resolution re-establishing system.

There is further provided in an embodiment of the present disclosure a human face resolution re-establishing system. The structure of the human face resolution re-establishing system is as shown in FIG. 6. The human face resolution re-establishing system comprises one or more processors 601 and one or more memories 602. Herein, the memory stores instructions that can be executed by a computer. When the processor 601 executes instructions stored in the memory 602, the above human face resolution re-establishing method is executed. The human face resolution re-establishing system can further comprise an input terminal 603 and an output terminal 604. Herein, the input terminal 603 receives an input image having a relatively low resolution, the output terminal 604 output an output image processed by the human face resolution re-establishing system, and thus the output image has information on the human face in the input image, and also has information on details of high resolution.

On such a basis, the processor 601 can access the memory 602 through a system bus. Besides storing the executable instructions, the memory 602 can store training data. The processor 601 may be various devices having calculating capability such as a central processing unit (CPU) or a graph processing unit (GPU). This CPU may be X86 or ARM processor; GPU can be directly integrated on the mainboard separately, or built in the north bridge chips of the mainboard, or built on the central processing unit (CPU). Due to its powerful image processing capability, the embodiment of the present disclosure can preferably use the GPU to train the convolutional neural network and perform image processing based on the convolutional neural network.

The human face resolution re-establishing system can further comprise data storage accessed by the processor 601 through the system bus. The data storage can comprise executable instructions, multi-image training data, etc. The human face resolution re-establishing system further comprises an input interface that allows an external device to communicate with the human face re-establishing system. For example, the input interface can be used to receive an instruction from an external computer device, an user, etc. The human face resolution re-establishing system can comprise an output interface which enables the human face resolution re-establishing system to be connected with one or more external devices. For example, the human face resolution re-establishing system can display images via the output interface. The external device considering to communicate the human face resolution re-establishing system via the input interface and the output interface can be included in an environment providing a user interface where any kind of user can be interacted with the external device in substance. Examples of the user interface types comprise a graph user interface, a natural user interface, etc. For example the graph user interface can accept an input from a user by adopting an input device such as a keyboard, a cursor mouse, a remote controller, etc., and can provide the output in an output device such as a display. In addition, a nature language interface can enable the user to interact with the human face resolution re-establishing system without getting the constraining manner imposed by input devices such as a keyboard, a cursor mouse, a remote controller, etc. On the contrary, the nature user interface can depend on voice recognition, touch and stylus recognition, gesture recognition on a screen or nearby a screen, air gesture, head and eye tracking, speech and voice, visual perception, touch, hand gesture, and machine intelligence, and so on.

Additionally, although the human face resolution re-establishing system is shown in the figure as a single system, it could be understood that the human face re-establishing system can also be a distribution system, or can be arranged as a cloud infrastructure (including a public cloud or a private cloud). Therefore, for example, several devices can perform communication via a network connection and can jointly execute a task described as being executed by the human face resolution re-establishing system.

Respective functions described in the present disclosure can be realized on a hardware, a software, a firmware or any combination thereof. If the respective functions are realized on the software, then these functions can be stored on a computer readable medium as one or a plurality of pieces of instructions or codes or transmitted via the computer readable medium.

There is further provided a computer readable medium in an embodiment of the present disclosure, comprising a computer readable storage medium. The computer readable storage medium can be any available storage medium that can be accessed by the computer. As an example, rather than defining, such computer readable medium can comprise RAM, ROM, EEPROM, CD-ROM or other optical storages, disk memories or other magnetic storage devices, or any other medium that can be used to bear or store instructions or expected program codes in the form of data structure and can be accessed by the computer. In addition, the propagated signal is not included within the range of the computer readable storage medium. The computer readable medium further comprises a communication medium including any medium which helps to bring about a computer program to be transferred from one location to another location. Connection may be for example a communication medium. For example, if the software uses a coaxial cable, a fiber optic cable, a twisted pair, a digital subscriber line (DSL), or wireless technologies such as infrared ray, radio and microwave to transmit from a web site, a server, or other remote source transmission, then the coaxial cable, the fiber optic cable, the twisted pair, the digital subscriber line (DSL), or the wireless technologies such as infrared ray, radio and microwave are included in the definitions of communication medium. The above combinations shall be included within the range of the computer readable medium. Alternatively or optionally, the functions described herein can be at least executed partially by one or more hardware logic groups. For example, descriptive types of available hardware logic components comprise Field Programmable Gate Array (FPGA), Application Specific Integrated Circuit (ASIC), Application Specific Standard Product (ASSP), System on Chip (SOC), Complex Programmable Logic Device (CPLD), etc.

The above descriptions are just specific implementations of the present disclosure, but the protection scope of the present disclosure is not limited thereto. The protection scope of the present disclosure shall be subject to the protection scope of the Claims.

What is claimed is:

1. A human face resolution re-establishing method, comprising:
    obtaining an input image having a first resolution;
    determining image gradient information of the input image based on the input image and a standard gradient image library having a second resolution;
    merging the image gradient information, and superimposing merged image gradient information into the input image; and
    generating an output image having a third resolution, wherein both the second resolution and the third resolution are greater than the first resolution,
    wherein the image gradient information comprises a second resolution characteristic gradient which is a facial characteristic gradient corresponding to the input image in a standard gradient image library, and determining the second resolution characteristic gradient comprises:
        estimating a pose and position of the input image, and extracting characteristic points of the input image;
        looking up a corresponding facial characteristic component in the standard gradient image library based on the pose and position, and the characteristic points; and
        calculating a characteristic gradient of the corresponding facial characteristic component, and determining it as the second resolution characteristic gradient.

2. The re-establishing method according to claim 1, wherein the image gradient information further comprises an edge gradient.

3. The re-establishing method according to claim 2, wherein the edge gradient is a human face contour gradient, and determining an edge gradient of the input image comprises:
    up-sampling the input image, reserving its directional characteristic, and obtaining a first image; and
    calculating gradient information of the first image as the edge gradient information of the input image.

4. The re-establishing method according to claim 1, wherein the looking up the corresponding facial characteristic component comprises:
    aligning the pose and position of the input image with a pose and position of an image sample in the standard gradient image library according to the pose and position of the input image; and
    finding out a facial characteristic component corresponding thereto in the standard gradient image library according to the characteristic points of the input image.

5. The re-establishing method according to claim 4, wherein the pose and position of the input image is aligned with the pose and position of the image sample in the standard gradient image library according to the following formula:

$$\min \Sigma \|T(x(h),y(h))-(x(I),y(I))\|^2$$

where $T(x(h), y(h))$ is a non-reflective symmetry transform of the image sample, and $(x(I),y(I))$ is an up-sampled input image, and when a characteristic point coordinate position difference value between a result of the non-reflective symmetry transform and the up-sampled input image reaches the minimum, image alignment is determined.

6. The re-establishing method according to claim 1, wherein the image gradient information further comprises a background gradient.

7. The re-establishing method according to claim 6, wherein the background gradient is a gradient of a flat region in the input image, and determining the background gradient comprises:
    up-sampling the input image to obtain a second image;
    calculating gradient information of the second image as the background gradient information of the input image.

8. The re-establishing method according to claim 7, wherein a process of obtaining the second image comprises:
    selecting a background region of the low-resolution image according to a self-learning statistic prior mode;
    transforming the background region into a high-resolution image with a set scale transformation factor s, wherein each pixel of the background region is up-sampled as s*s pixel blocks; and ensuring that an image obtained by up-sampling satisfies Gaussian distribution through a back propagation algorithm.

9. The re-establishing method according to claim 1, wherein merging the image gradient information comprises: setting that an upper-left pixel value of the image region after information is merged equates to an upper-left pixel value of the input image, and then obtaining merging information by utilizing the least square principle:

$$\min\sqrt{(\nabla s-b)^2}$$

where $\nabla$ is a gradient operator, b is gradient, and s is merging information to be acquired.

10. The re-establishing method according to claim 1, further comprising constructing the standard gradient image library.

11. The re-establishing method according to claim 1, further comprising aligning image samples in the standard gradient image library.

12. The re-establishing method according to claim 11, wherein aligning image samples in the standard gradient image library comprises:
selecting one image sample from the standard gradient image library as a standard image;
obtaining characteristic points of the standard image according to a SIFT algorithm, and selecting one characteristic point set therefrom and storing it;
aligning other image samples in the standard gradient image library with the standard image comprises:
selecting an image sample from the standard gradient image library as an aligned image, obtaining characteristic points of the aligned image according to the SIFT algorithm, and finding out a characteristic point set most similar to the characteristic point set of the standard image;
rotating and scaling the aligned image until its characteristic point set has a proportional correspondence relationship of the characteristic point set in the standard image;
translating a coordinate of the characteristic point set of the aligned image to a position of the characteristic point set of the standard image to obtain a SIFT light stream; and
utilizing light stream information to translate other pixel points in the aligned image to a corresponding position on the standard image, and completing alignment of the aligned image and the standard image.

13. The re-establishing method according to claim 1, further comprising training the standard gradient image library.

14. The re-establishing method according to claim 13, wherein a step of training the standard gradient image library comprises:
training each image sample in the standard gradient image library, wherein a process of training each image sample comprises:
selecting one image sample from the standard gradient image library as a training sample, Gaussian smoothing and down-sampling the training sample to obtain a third image, and obtaining a characteristic mask pattern from the third image, wherein the characteristic mask pattern covers a characteristic component defined by characteristic points of the third image;
utilizing the characteristic mask pattern to look up a most similar facial characteristic component from the standard gradient image library by means of self-learning; and
extracting a characteristic gradient from the most similar facial characteristic component looked up.

15. The re-establishing method according to claim 3, wherein performing up-sampling through a bicubic interpolation method to acquire the edge gradient:

$$f(x, y) = \sum_{i=0}^{3} \sum_{j=0}^{3} (x(i), y(j))W(x - x(i))W(y - y(j))$$

(x,y) is a pixel point to be interpolated, (x(i), y(j)) is 4x4 neighborhood point nearby the pixel point to be interpolated, i,j=0, 1, 2, 3, and W is a weighting function.

16. A human face resolution re-establishing system, comprising:
one or more processors;
one or more memories,
wherein the memory stores a computer executable instruction, and the executable instruction executes the re-establishing method according to claim 1 when being ran by the processor.

17. The re-establishing system according to claim 16, further comprising an input terminal which receives an input image having a first resolution and an output terminal which outputs an output image having a third resolution, wherein the third resolution is higher than the first resolution.

18. A non-transitory computer readable medium storing a computer executable instruction and executing the re-establishing method according to claim 1 when the executable instruction is ran by a processor.

* * * * *